D. BAIRD.
Millstone Exhaust.
No. 71,677.
Patented Dec. 3, 1867.
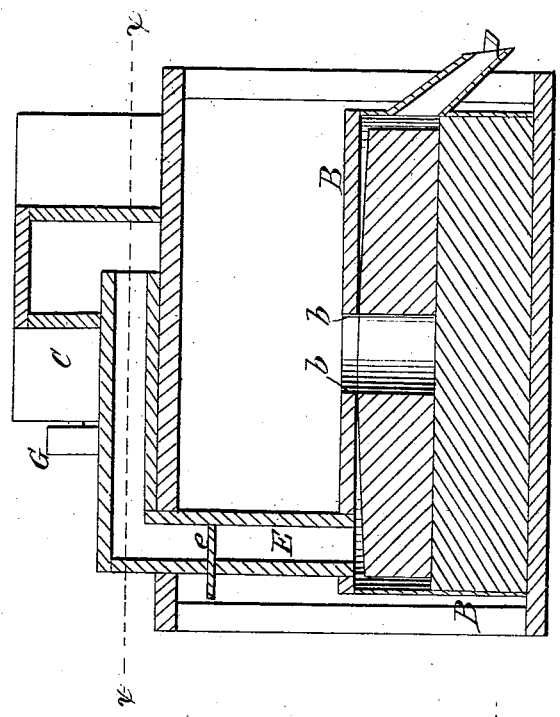
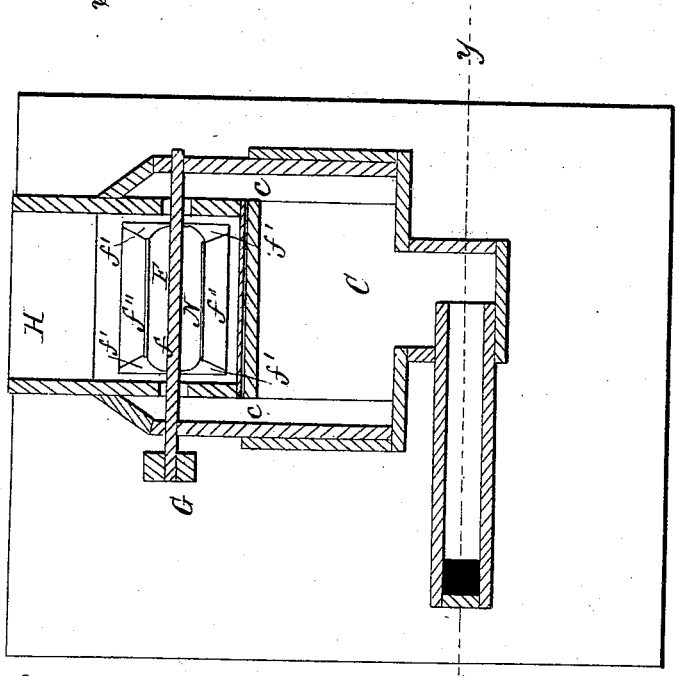

United States Patent Office.

DAVID BAIRD, OF BLOODY RUN, PENNSYLVANIA.

Letters Patent No. 71,677, dated December 3, 1867.

IMPROVED EXHAUST FOR MILLSTONES.

*The Schedule referred to in these Letters Patent and making part of the same.*

TO ALL WHOM IT MAY CONCERN:

Be it known that I, DAVID BAIRD, of Bloody Run, in the county of Bedford, and State of Pennsylvania, have invented a new and improved Exhaust for Millstones; and I do hereby declare the following to be a full, clear, and exact description of the same, reference being had to the accompanying drawings, forming part of this specification, and in which—

Figure 1 is a horizontal section of my invention through the line $x$ in fig. 2.

Figure 2 is a cross-section of the same through the line $y$ in fig. 1.

Similar letters of reference indicate corresponding parts in the two figures.

In this invention the hot air, steam, &c., is exhausted from around the millstones through a pipe, in which a current of air is established by a fan.

The object of the invention is to exhaust the hot, moist air from around the stones by a current of cool air, which can be regulated at pleasure, and to leave the flour to be discharged through a pipe from the bottom of the box enclosing the stones, in the usual manner. To effect this object the stones are enclosed in an air-tight box. An exhaust-pipe leads from this box to a box above the stones, and a powerful fan, operated by the shaft that drives the stones, exhausts the air from this upper box by means of two side pipes.

In order that others skilled in the art to which my invention appertains may be enabled to make and use the same, I will proceed to describe it in detail.

In the drawings, B represents the box enclosing the millstones, provided at one side of its bottom with a discharge-pipe, D, which delivers the flour, and at one side of its top with an exhaust-pipe, E, through which the hot, damp air is carried away from the stones. The grain is fed, as usual, through the top of the box at the centre of the stones, and the cool air is drawn in to the stones at the same point. Around the throat through which the grain is thus fed, suitable packing is provided, to prevent the escape of air between the upper stone and the box around the line $b\ b$. The exhaust-pipe is provided with a valve, $e$, by which the quantity of air forced through it can be perfectly regulated in accordance with the condition of the stones and the necessity of a greater or less draught. At the upper extremity of the exhaust-pipe is the large chamber C, having two outlet-pipes, $c\ c$, one at each side or end, communicating with the circular box or screen, A, in which runs the fan F, and discharging equal currents of air directly into the centre of the box and fan. The fan F is of peculiar construction, consisting of the shaft $f$, arms $f'$, and longitudinal paddles $f''$, worked by means of a pulley, G. H is a chute, from which the foul air, steam, &c., are finally discharged, and may be prolonged to any extent, so as to carry the hot air, &c., out of the mill, if desired.

My improved apparatus has been thoroughly tested on a running mill, and gives entire satisfaction, producing an excellent quality of flour, in a condition when it comes from the stones to bolt perfectly. It was found, on actual trial, that from the improvement in the bolting of the flour, resulting from the attachment of my apparatus to the mill, a very large increase of product was immediately obtained.

By means of the valve $e$, if from any cause it should be desired to increase the dampness of the flour, the required effect can be immediately obtained. In fact the miller has the whole matter perfectly under his control, and can impart to the flour any degree of dampness or dryness that, in his judgment, may be best adapted to secure its perfect bolting.

Having thus described my invention, what I claim as new, and desire to secure by Letters Patent, is—

The combination and arrangement of the box B, having the discharge-port D, and enclosing the millstones, with the exhaust-pipe E, chamber C, having two outlets, $c\ c$, and the fan F, the latter arranged between the two exhaust-pipes $c\ c$, and drawing the air through each of them, substantially in the manner and for the purposes indicated.

To the above specification of my improvement, I have signed my hand, this 5th day of July, 1867.

DAVID BAIRD.

Witnesses:
CHAS. A. PETTIT,
SOLON C. KEMON.